US010206206B2

(12) United States Patent
Dahlman et al.

(10) Patent No.: US 10,206,206 B2
(45) Date of Patent: Feb. 12, 2019

(54) METHOD AND FIRST NETWORK NODE FOR MANAGING A REQUEST FOR CONNECTIVITY FOR A SERVICE OF A WIRELESS DEVICE

(71) Applicant: Telefonaktiebolaget LM Ericsson (publ), Stockholm (SE)

(72) Inventors: Erik Dahlman, Stockholm (SE); Magnus Frodigh, Sollentuna (SE); Mikael Höök, Sollentuna (SE); Harald Kallin, Sollentuna (SE); Gunnar Mildh, Sollentuna (SE); Joachim Sachs, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 136 days.

(21) Appl. No.: 15/122,797

(22) PCT Filed: Mar. 4, 2014

(86) PCT No.: PCT/SE2014/050264
§ 371 (c)(1),
(2) Date: Aug. 31, 2016

(87) PCT Pub. No.: WO2015/133946
PCT Pub. Date: Sep. 11, 2015

(65) Prior Publication Data
US 2017/0223666 A1 Aug. 3, 2017

(51) Int. Cl.
*H04W 4/00* (2018.01)
*H04W 72/04* (2009.01)
(Continued)

(52) U.S. Cl.
CPC ....... *H04W 72/042* (2013.01); *H04L 41/5009* (2013.01); *H04L 43/0805* (2013.01);
(Continued)

(58) Field of Classification Search
None
See application file for complete search history.

(56) References Cited

U.S. PATENT DOCUMENTS

2004/0203698 A1* 10/2004 Comp .................. H04W 8/005
455/421
2007/0097862 A1 5/2007 Moon et al.
(Continued)

FOREIGN PATENT DOCUMENTS

| EP | 2288091 A1 | 2/2011 |
| WO | 02089502 A2 | 11/2002 |
| WO | 02089502 A3 | 2/2003 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0 (Dec. 2013), Dec. 2013, 1-349.

(Continued)

*Primary Examiner* — Zewdu A Beyen
(74) *Attorney, Agent, or Firm* — Sage Patent Group

(57) ABSTRACT

A method and a first network node (120) of a wireless network (100) for managing a request for a connectivity for a service of a wireless device (110) are disclosed. The first network node (120) is configured to use a first set of resources of the wireless network (100). The first network node (120) receives (403) the request for the connectivity. The request is associated with a required level of a connectivity for the service. The required level of the connectivity relates to likelihood of maintaining the connectivity towards the wireless network (100). The first network node (120) further configures (404) the first set of resources to increase an estimated level of the connectivity for the service towards the wireless network (100). The estimated level of the (Continued)

connectivity is associated with the wireless network (100). A corresponding computer program and a computer program product are also disclosed.

7 Claims, 3 Drawing Sheets

(51) Int. Cl.
    *H04W 72/00*     (2009.01)
    *H04L 12/24*     (2006.01)
    *H04L 12/26*     (2006.01)
    *H04W 76/10*     (2018.01)
    *H04W 24/08*     (2009.01)
    *H04W 74/08*     (2009.01)
    *H04W 4/70*     (2018.01)

(52) U.S. Cl.
    CPC ........... *H04W 24/08* (2013.01); *H04W 72/00* (2013.01); *H04W 72/0473* (2013.01); *H04W 74/0833* (2013.01); *H04W 76/10* (2018.02); *H04L 41/147* (2013.01); *H04L 43/10* (2013.01); *H04W 4/70* (2018.02)

(56) References Cited

U.S. PATENT DOCUMENTS

| | | |
|---|---|---|
| 2007/0239862 A1 | 10/2007 | Bronez et al. |
| 2011/0075605 A1* | 3/2011 | De Pasquale ......... H04B 7/022 370/328 |
| 2012/0163171 A1 | 6/2012 | Lee et al. |
| 2013/0094371 A1 | 4/2013 | Vallath et al. |
| 2013/0288668 A1* | 10/2013 | Pragada ............... H04W 12/06 455/426.1 |
| 2013/0311900 A1 | 11/2013 | Schleier-Smith Johann et al. |

OTHER PUBLICATIONS

3GPP, "3rd Generation Partnership Project; Technical Specification Group Services and System Aspects; Policy and charging control architecture (Release 12)", 3GPP TS 23.203 V12.0.0 (Mar. 2013), Mar. 2013, 1-183.

\* cited by examiner

METHOD AND FIRST NETWORK NODE FOR MANAGING A REQUEST FOR CONNECTIVITY FOR A SERVICE OF A WIRELESS DEVICE

TECHNICAL FIELD

Embodiments herein relate to wireless communication systems, such as telecommunication systems. The present disclosure generally relates to a method and a first network node of a wireless network, for managing a request for a connectivity for a service of a wireless device. A corresponding computer program and a computer program product are also disclosed.

BACKGROUND

Today wireless communication systems are mainly used for human-centered communication and services. A trend is, however, to use wireless communication systems for communication and services mainly involving machines. This kind of communication and services are often referred to as Machine-to-Machine (M2M) communication.

Certain types of communication and services within M2M communication are expected to require that a wireless connection, provided by the wireless communication systems, is highly reliable. The wireless connection is required to be highly reliable both in terms of loss of the wireless connection and the possibility of establishing the wireless connection. In the following, the term "reliable" is used in this context. Therefore, for the above mentioned certain types of communication and services within M2M communication, a high reliability of the connection, or the possibility to establish connection, may be said to be required.

This kind of high reliability may also be required for Person-to-Machine (P2M), Person-to-Person (P2P) and Machine-to-Person (M2P) communication.

Services that may need this kind of high reliability include industrial process control services, services for alarm monitoring, services in smart grid applications, control and management of business and/or mission critical processes or services, services for monitoring critical infrastructure and services towards responders in the national security and public safety segment and other similar services.

Furthermore, high reliability for certain services may be beneficial where deployment of nodes, such as radio base station, radio network controller etc., is particularly costly. At the same time, it is desired to achieve sufficient capacity, e.g. in terms of number of connected devices, and/or coverage for the services.

Consider for example a device, such as smart meters for a smart grid, a metering, sensing or activation device, that is deployed in a network at a remote location at high cost. If there would be a failure in communication with such a device e.g. due to bad coverage and/or insufficient capacity, a manual restoration of the communication with the device or a replacement of the device with another device would be required to compensate for the failure. Such compensation may imply high labor costs, which would scale in an unacceptable manner when there are a great number of devices which often is the case in application of M2M communication.

It is known to provide connectivity for M2M devices in a number of different ways using e.g. wired or wireless connections. The wired connections may be copper wires, optical fibers, Ethernet cables or the like. The wireless connections may be provided by use of various Radio Access Technologies (RATs), such as Wi-Fi, Evolved Universal Terrestrial Radio Access Network for Long Term Evolution (EUTRAN/LTE), Universal Terrestrial Radio Access Network for High Speed Packet Access (UTRAN/HSPA), Global System for Mobile communication (GSM) for Enhanced Data GSM Environment (EDGE) Radio Access Network (GERAN) and the like. Moreover, evolutions of the aforementioned RATs as well as other Third Generation Partnership Project (3GPP) networks may be used to provide the wireless connection.

During planning of the radio access networks and/or telecommunication systems mentioned above, it is sometimes desired to set up the radio access network such as to provide a high reliability for M2M devices. High connectivity could then be provided in the following ways.

For example, the radio access network could be deployed as over-dimensioned in terms of transport and/or radio link resources. Over-dimensioning of transport resources may refer to use of optical fibers for communication from a base station, while a peak bit-rate from the base station is 800 Megabits per second and an optical fiber may handle tenth of Gigabits per second. Over-dimensioning of radio link resources refers to deployment of more base stations, antennas, use of more frequency bands, etc. than needed according to an estimated network load. The RAN is said to be over-dimensioned when it is deployed to be able to handle a worst case scenario while still having resources that are available for any upcoming communication.

As another example, so called node availability may be increased by introducing redundancy in a node by installing multiple power units for powering of the node. The node availability may relate to availability of e.g. transport nodes, radio nodes and server nodes, which communicate with the M2M device or control or support the network operation. Node availability decreases on failure of a node, which typically happens when power units for powering of the node breaks down.

As a further example, in some specific network segments, multiple paths could be introduced to avoid single point of failure. An optical fiber ring is able to cope with interruptions of one optical link by routing information in the opposite direction as compared to where the interrupted optical link is located.

An exemplifying radio communication system applies over-dimensioning to ensure that there are resources available, whenever needed, for use by a first service requiring high reliability. Those resources are thus reserved for use by the first service only, or possibly for use by so called best-effort services. Hence, further resources needs to be reserved for a second service requiring high reliability. Therefore, a disadvantage with over-dimensioning may be that many resources are reserved for only a specific service, such as the first or second service. Thus, the reserved resources may not always be efficiently used.

SUMMARY

It is an object of embodiments described herein to address at least some of the problems and issues outlined above. It is possible to achieve this object and others by using a method and a first network node as defined in the attached independent claims.

According to one aspect, a method is performed by a first network node for managing a request for a connectivity for a service of a wireless device, wherein the first network node is comprised in a wireless network and the first network node is configured to use a first set of resources of the wireless network. In this method, the first network node receives the request for the connectivity, wherein the request is associated with a required level of a connectivity for the service, and wherein the required level of the connectivity relates to likelihood of maintaining the connectivity towards the wireless network. The first network node further configures the first set of resources to increase an estimated level of the connectivity for the service towards the wireless network, wherein the estimated level of the connectivity is associated with the wireless network.

According to another aspect, a first network node is configured to manage a request for a connectivity for a service of a wireless device, wherein the first network node is comprised in a wireless network. The first network node is configured to use a first set of resources of the wireless network. The first network node is further configured to receive the request for the connectivity, wherein the request is associated with a required level of a connectivity for the service, and wherein the required level of the connectivity relates to likelihood of maintaining the connectivity towards the wireless network. The first network node is also configured to configure the first set of resources to increase an estimated level of the connectivity for the service towards the wireless network, wherein the estimated level of the connectivity is associated with the wireless network.

According to further aspects, a computer program and a computer program product, related to the method and first network node mentioned above, are provided.

The request is associated with, e.g. specifies, the required level of the connectivity for the service. In this manner, the first network node is made aware of the required level of the connectivity. Then, the first network node further configures the first set of resources to increase the estimated level of the connectivity for the service towards the wireless network. Thereby, the first network node makes an attempt of ensuring that the required level of the connectivity for the service is provided.

An advantage may be that probability of rejecting the request is reduced. For example, the request may be rejected based on that the required level of connectivity is greater than the increased estimated level of connectivity.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
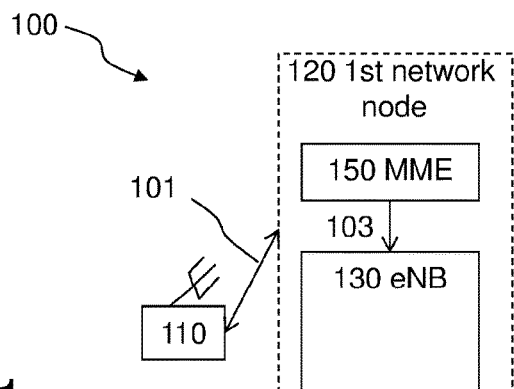
FIG. 1 is a block diagram illustrating an architecture of a wireless network, in which the embodiments herein may be implemented.

Throughout the following description similar reference numerals have been used to denote similar elements, units, modules, circuits, nodes, parts, items or features, when applicable. In the Figures, features that appear in some embodiments are indicated by dashed lines.

FIG. 1 depicts an exemplifying wireless network 100 in which embodiments herein may be implemented. In this example, the wireless network 100 is a Long Term Evolution (LTE) system. In other examples, the radio communication system may be any cellular or wireless communication system, such as a Wideband Code Division Multiple Access (WCDMA) network, a Global System for Mobile communication (GSM network), Wireless Fidelity (Wi-Fi) or the like.

A wireless device 110 is shown in FIG. 1. The wireless network 100 may serve the wireless device 110.

The wireless network 100 comprises a first network node 120 which may communicate 101 with the wireless device 110.

The first network node 120 may be a radio base station 130, such as an evolved Node B (eNB), a Node B, a control node controlling one or more Remote Radio Units (RRUs), a radio base station, an access point or the like.

In other examples, the first network node 120 may be a node for managing mobility of the wireless device 110, such as a Mobility Management Entity (MME) 150 or the like.

As used herein, the term "wireless device" may refer to a user equipment, a M2M device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities, a car with radio/wireless communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc. The term "user" may indirectly refer to the wireless device.

Before the embodiments herein are described, level of connectivity, as a concept, is explained with reference to the block diagrams in FIG. 2 and FIG. 3. The wireless device 110 may be referred to as a M2M device.

Level of connectivity may also be referred to as connectivity availability. Generally, the level of connectivity is herein defined as a probabilistically guaranteed promise that some sufficiently good connectivity, which e.g. fulfils service requirements for a specific M2M service, can be provided at or above some degree of likelihood. Service requirements are further described in section "service requirements" below. In some examples, the level of connectivity may be a value relating to likelihood of maintaining the connectivity towards the wireless network 100, such as the first network node 120, for a service, such as the specific M2M service or the like.

Figure 2:
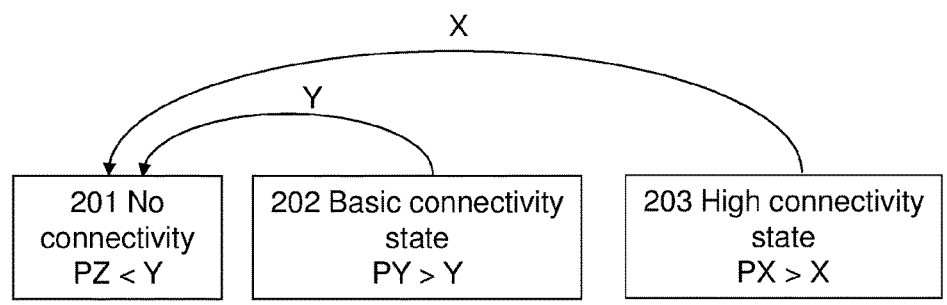
FIG. 2 is a logic diagram illustrating connectivity of a wireless device, according to some possible embodiments.

FIG. 2 shows a block diagram illustrating three exemplifying states relating to levels of connectivity. The three exemplifying states includes a first state 201 with no connectivity, a second state 202 with basic level of connectivity and a third state 203 with high level of connectivity.

In this example, a level of connectivity is given by a probability value between 0 and 1. Therefore, the level of connectivity may be a digit, a value, a string of bits or the like, which is representing some specific level of connectivity. Thus, the level of connectivity relates to likelihood, or probability, for a service, executed in the wireless device 110, to maintain connectivity to the wireless network 100 and/or e.g. the first network node 120.

To maintain the connectivity means that the wireless device 110 may maintain, i.e. not drop, a wireless connection that has been established.

Moreover, to maintain the connectivity means that the wireless device 110 may establish, or set up, a wireless connection successfully with likelihood given by the probability value. Since the connectivity applies to the service, expressed herein as connectivity for the service, service requirements for the service are accordingly fulfilled by the connectivity, e.g. the wireless connection, be it an already exiting connection or a connection to be set up.

With the concept of level of connectivity, a required level of the connectivity shall be distinguished from an estimated level of the connectivity.

The required level of the connectivity may be determined by the service, i.e. the service, or in fact a person providing or handling the service, may set the required level of the connectivity to a certain values, e.g. 0.9. For this reason, the required level of the connectivity may be referred to as a desired, or even required, level of the connectivity. As mentioned above, level of connectivity in general may be represented by values between 0 and 1. Thus, a value of 0.9 may be considered to represent a high level of connectivity. The required level of the connectivity may also be a default level of the connectivity. The default level of the connectivity may apply for a particular service or a group of services. In other examples, the required level of the connectivity may be represented by descriptors as "poor", "medium", "high" or the like, which descriptors in turn may be associated with certain ranges of the level of the connectivity.

The required level of the connectivity may, additionally or alternatively, be set by a network node, comprised in the wireless network 100. The network node may handle requests for services and/or connections therefore. As an example, the network node may be an eNB in LTE, a Radio Network Controller (RNC), Mobility Management Entity (MME), Serving General Packet Radio Service Support Node (SGSN), Policy and Charging Rules Function (PCRF), Home Subscriber Server (HSS), Home Location Register (HLR) or the like. When the network node sets the required level of the connectivity, it may set different levels of the connectivity for different services, different users, i.e. different nodes such as the wireless device 110, different user groups, different types of devices and the like. The different users, or user groups, may be different in terms of subscriptions, home network etc. The different types of devices may be different in terms of being mobile or stationary, a user device or a machine device and the like.

The estimated level of the connectivity may for example be determined as described in section "Determining level of connectivity". The estimated level of the connectivity depends on radio conditions, traffic load etc. in the wireless network 100. Therefore, the estimated level of the connectivity reflects actual, or real, level of the connectivity for the service towards the wireless network. The estimated level may thus correspond to an actual, or current, level of the connectivity. As a consequence, when the estimated level is increased, or decreased, it means that the actual level of the connectivity, which the estimated level is an estimate of, is in fact increased, or decreased. The increase or decrease of the estimated level may occur due to that certain actions, e.g. relating to ensuring of the required level of the connectivity, as described herein are performed.

As described above, the level of the connectivity may be expressed as probability for a service to maintain connectivity to the wireless network 100. This means that the probability may be linked to a time period. Hence, as an example, the probability of losing the connectivity during an upcoming (future) time period is 0.9. In other examples, the probability may relate to that an event occurs. The event may e.g. be that a fire alarm report is in fact received by a probability of 0.9999 which would set a requirement that there is connectivity when the fire alarm actually goes off.

Furthermore, the level of the connectivity may be expressed as Mean Time Between Failures (MTBF). For example, when the MTBF of the connectivity is 100 years, failure is very rare.

The three exemplifying states relating to levels of the connectivity may be seen as a quantization of the levels of the connectivity.

In FIG. 2, threshold values X and Y for deciding when to consider the service to be in any one of the three states 201, 202, 203 relating to levels of the connectivity are indicated. Expressed differently, an exemplifying M2M device (not shown) may be in one of the three states depending on relations between an estimated probability value relating to the level of the connectivity and the threshold values X and Y. The M2M device may be an example of the wireless device 110 and/or the first network node 120.

The estimated probability value may be given, e.g. indirectly or directly, by the estimated level of the connectivity. Hence, the estimated probability value may be given indirectly by the estimated level of the connectivity when the estimated level of the connectivity represents a probability. For example, when the estimated level of the connectivity is equal to 300, it represents e.g. a probability of 0.7. This means that the estimated level of the connectivity may need to be translated, interpreted or the like, before it can be used as a probability value. Alternatively, the estimated probability value may be given directly by the estimated level of the connectivity when the estimated level of the connectivity is e.g. equal to 0.7. In this case, the estimated level of the connectivity can be used directly without a need for translation, interpretation or the like, since probability values range from zero to one.

The three states are in this example defined as follow, starting with the third state 203 for ease of explanation. In order to find out in which state the service is the estimated probability value may be determined as mentioned above. Throughout this example, it is assumed that the same service requirements for the service apply in all states.

High Connectivity State

The M2M device may be in a so called high connectivity state aka the third state. The connectivity may be considered high if the estimated probability value, here denoted PX, is e.g. above a threshold X. While using the reference numerals in the Figure, we have that PX>X.

Basic Connectivity State

The M2M device may be in a so called basic connectivity state aka the second state. While assuming in this example that the estimated probability value is PY, the connectivity may be considered to be basic if PY is e.g. above a threshold Y. At the same time, PY is not high enough to reach the high connectivity state, i.e. the estimated probability value PY is less than the threshold X. While using the reference numerals in the Figure, we have that Y<PY<X.

No Connectivity

The M2M device may be in a state of no connectivity aka the first state. In this state, the M2M device has no connection to the network or a connection that does not fulfil the service requirements, and the M2M device has therefore no service. Furthermore, the M2M device may not have, as far as it can be estimated, any possibility to obtain a connection. This means that the estimated probability value, now denoted by PZ, is not high enough to reach the basic connectivity state. As an example, the M2M device may be out-of-coverage in view of the wireless network 100. While using the reference numerals in the Figure, we have that PZ<Y.

In the description above, the M2M device is said to be in the different states mentioned above for reasons of simplicity. In some examples, in case a M2M device runs multiple services, each of those multiple services may be said to be in the different states. Some or all of the multiple services may be in the same state or all of the multiple services may be in a respective state.

In the following description, two example scenarios will be referred to in order to improve understanding.

In a first exemplifying scenario, the wireless network 100 is included in, or forms a part of, a traffic control system, which includes various entities, e.g. traffic lights, vehicle such as car and trucks, bicyclists carrying cellular phones. At least some of the entities communicate over the wireless network 100. This means that some entities of the traffic control system may be within the wireless network 100 and some other entities may be outside the wireless network 100.

As an example, some functions related to control of vehicles etc. can be automated when the high connectivity state is reached or available, but these functions need to operate in a half-automatic or manual mode for safety reasons when only basic connectivity state is reached or available.

In a second exemplifying scenario, the wireless network 100 is included in an industrial control system or power system. The industrial control system may comprise various entities, such as valves, transportation belts, spray devices for painting or physical/chemical treatment etc. At least some of the entities communicate over the wireless network 100. This means that some entities of the industrial control system may be within the wireless network 100 and some other entities may be outside the wireless network 100.

The industrial control system may operate at lower margins with higher efficiency, e.g. higher yield, when the entities communicating over the wireless network 100 have high connectivity state, e.g. with bounded latency, compared to when the entities only have basic connectivity state, which would require higher margins since the industrial control system needs e.g. more time to react, treat, open/close valves etc.

In the second scenario, it may be that the industrial control system is operated based on local information, or half-automatic mode, when the entities communication over the wireless network 100 have low connectivity state. Local information may have been stored in the entities prior to the low connectivity state.

Figure 3:
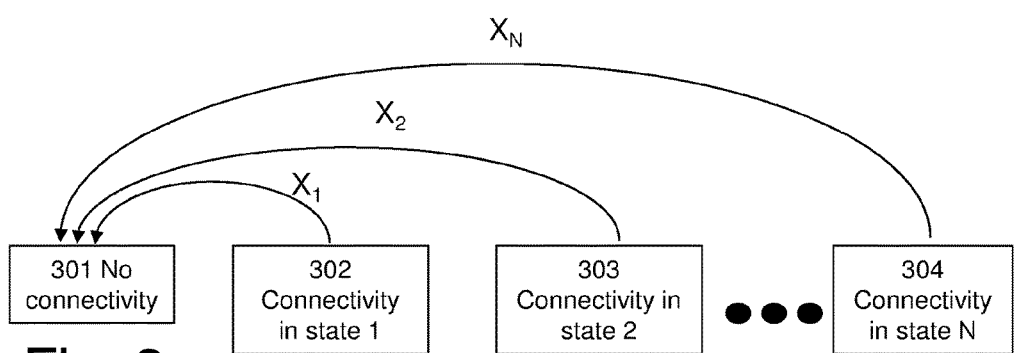
FIG. 3 is another logic diagram illustrating connectivity of a wireless device, according to further possible embodiments.

In FIG. 3, another block diagram illustrates a more general case with N number of states relating to level of connectivity. As illustrated in this Figure, the states shown in FIG. 2 may be extended to include additional states with different levels of connectivity, e.g. with different transition probabilities X1 . . . XN for transition from one state to another.

Figure 4:
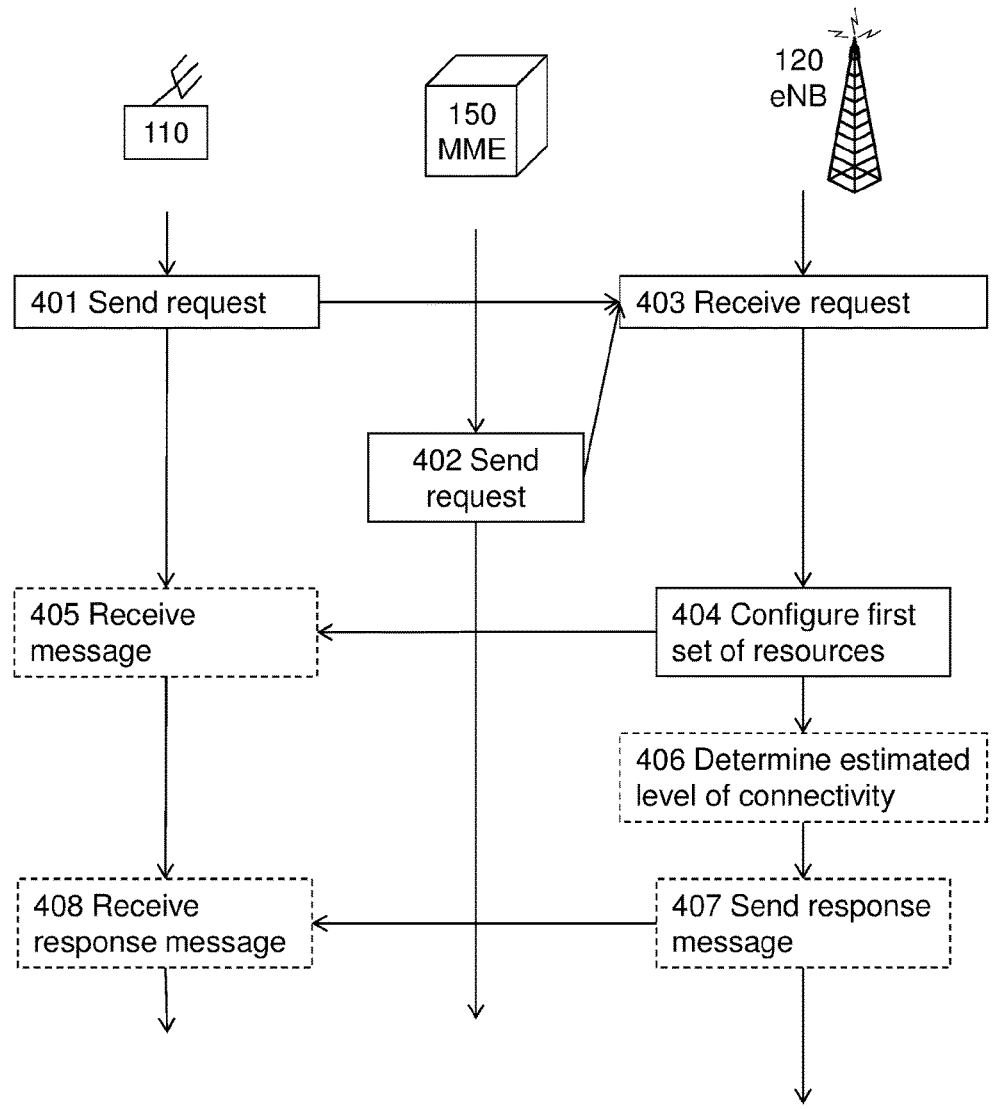
FIG. 4 is a signaling diagram illustrating an example of a procedure when the solution is used, according to further possible embodiments.

FIG. 4 illustrates an exemplifying method for managing a request for a connectivity for a service of the wireless device 110 when performed in connection with the wireless network 100 of FIG. 1. The service may be executed in the wireless device 110. Therefore, the service is capable of communicating with the first network node 120 over the wireless network 100.

The first network node 120 is configured to use a first set of resources of the wireless network 100.

The following actions may be performed in any suitable order.

Action 401

In order for the first network node 120 to receive the request for the connectivity, the wireless device 110 may send the request. The request is associated with a required level of a connectivity for the service. As mentioned, the required level of the connectivity relates to likelihood of maintaining the connectivity towards the wireless network 100. In this action, the connectivity is device initiated. This means e.g. that a software application executing in the wireless device 110 may cause the request to be sent by the wireless device 110 due to e.g. that information required by the software application may need to be retrieved from e.g. a server or sent to e.g. a server.

Action 402

In order for the first network node 120 to receive the request for the connectivity, the second network node 150 may send the request. In this action, the connectivity is network initiated. This means e.g. that a software application executing in a server may cause the request to be sent by the wireless device 110 due to e.g. that information required by the server may need to be retrieved from the wireless device 110 or sent to the wireless device 110.

Action 403

In response to action 401 and/or action 402, the first network node 120 receives the request for the connectivity.

According to the above, the request may be received from the wireless device 110, as in action 401, or from the second network node 150, as in action 402, for managing requests for connectivity.

Action 404

The first network node 120 configures the first set of resources to increase an estimated level of the connectivity for the service towards the wireless network 100, wherein the estimated level of the connectivity is associated with the wireless network 100.

The first network node 120 may configure the first set of resources according to one or more of the manners described in section "Ensuring level of connectivity" below.

Action 405

In order to inform the wireless device 110 about the manner of ensuring, as described in section "Ensuring level of connectivity", the first network node 120 may send a message indicating the manner of ensuring to the wireless device 110.

Action 406

The first network node 120 may determine the estimated level of connectivity. This is elaborated in section "Determining level of connectivity" below.

Action 407

The first network node 120 may send, to the wireless device 110, a response message indicating a relation between the estimated level of connectivity and the required level of connectivity.

Action 408

As a consequence of action 407, the wireless device 110 may receive, from the first network node 120, the response message. In some examples, the wireless device 110 may adapt its operation based on the response message. Reference is here made to section "Adapting operation" below.

Ensuring Level of Connectivity

Hence, the first network node 120 may configure the first set of resources according to one or more of the following manners. In the paragraphs below, the first network node 120 will be referred to as "ensuring node".

In a first manner, the ensuring node may configure the first set of resources by reserving a sub-set of the first set of resources for the service, wherein at least the sub-set of resources are required to ensure the required level of the connectivity.

As an example, the first set of resources may be resources blocks, such as Physical Resource Blocks, of a time-frequency grid in LTE. Then, the ensuring node may reserve a sub-set of the resource blocks such that these resources blocks are available for the service when required.

As an example, the reserved sub-set of the first set of resources may be reserved by that if a request for service of the same or less Allocation and Retention Policy (ARP) priority is received at the ensuring node, the ensuring node may need to reject such request for service if the reserved sub-set of resources would be allocated when admitting the request.

In a second manner, the ensuring node may configure the first set of resources by reducing an amount of the first set of resources, which amount of the first set of resources are assigned to a further service in advance of or when the service becomes active.

As mentioned, the first set of resources may be resources blocks, such as Physical Resource Blocks, of a time-frequency grid in LTE. Then, the ensuring node may determine that a specific amount of resources blocks are used by the further service. Thereafter, the ensuring node may reduce the specific amount such that the service is prioritized at the expense of the further service, which may degrade, such as experience delays, or even interruption.

In a third manner, the ensuring node may configure the first set of resources by moving a further service, to which some of the first set of resources have been assigned, in advance of or when the service becomes active, to a second set of resources. The second set of resources is different from the first set of resources.

As an example, the ensuring node may perform a handover or a cell change order to move at least one further wireless device to another cell, another frequency band or another Radio Access Technology (RAT) than that of the wireless device 120. The cell change order may mean that the ensuring node sends a message for instructing the further wireless device to perform a change cell, or perform cell reselection.

In a fourth manner, the ensuring node may configure the first set of resources by increasing the first set of resources by allocating further Random Access (RA) channels to the service and/or transmit with increased transmit power.

As an example relating to the allocation of further RA channels, the ensuring node may configure different number of occasions in time, e.g. periodicity in terms of 5 ms, 10 ms or the like, and different number of occasions in frequency, e.g. in terms of 1, 2, 3 Resource Blocks (RB) or the like. It may here be noted that the number of Random Access occasions, i.e. in terms of time and/or frequency, are configured per cell in LTE. With many occasions, i.e. many RA resources/channels, it means that the total number of uplink RBs that can be used for data will be fewer, but the success rate of the Random Access Channel will be higher even at high network load. Thus, the level of the connectivity may be ensured e.g. in terms of being fulfilled, or the level of the connectivity may at least be increased.

As an example relating to transmit with higher power, the ensuring node may increase transmit power for the user whose level of connectivity is to be ensured. This may lead to that the ensuring node reduces transmit power assigned to other users, i.e. those users for which level of connectivity is not to be ensured.

In yet further examples, a more robust coding may be used for the users whose level of connectivity is to be ensured, or increased.

In a fifth manner, the ensuring node may configure the first set of resources by setting up a connection towards the wireless device 110 while using at least some of the first set of resources.

In an example, it is assumed that a user for which the level of the connectivity is to be ensured, or increased, has a first connection which uses a first radio access technology. Then the ensuring node may set up a further connection which uses a second radio access technology, which is different from the first radio access technology. This may be beneficial for the user if the user is considered to have high connectivity when there are at least two existing connections.

In a sixth manner, the ensuring node may configure the first set of resources by sending a message to the wireless device 110. The message instructs the wireless device 110 to measure on non-serving cells, non-serving frequencies, non-serving Radio Access Technologies to find a third set of resources for increasing the estimated level of the connectivity. The third set of resources is different from the first set of resources.

As mentioned above, the ensuring node may combine one or more of the first to sixth manners to obtain yet further manners of configuring the first set of resources.

In some further embodiments relating to how the level of the connectivity is determined and/or ensured, selected roaming may be taken into account. Selected roaming refers herein to that the wireless device is configured to roam into another network on request by a so called home network, not due to out of coverage of the home network. Hence, selected roaming may be enabled for the wireless device in order to determine the estimated level of the connectivity or in order to ensure, or attempt to ensure, the required level of the connectivity.

Note that enabling the wireless device for selected roaming may imply additional costs for an operator, depending on existing roaming agreements. E.g. an operator may limit number of wireless devices for which selected roaming is possible, or the cost of the roaming agreement depend on number of wireless devices that make use (or are configured for) selected roaming, or the amount of roaming traffic. For this reason, the operator may try to limit number of wireless devices that make use of selected roaming to be as few as possible. At the same time, new devices/services may require connectivity availability that may not always be provided by the operator. Since the wireless device is expected to provide relatively high revenue for the operator there is a desire to be able to fulfill the connectivity requirements, e.g. given by the required level of the connectivity. This may be done via selected roaming.

The selected roaming may be configured per type of wireless device, e.g. devices that require a high required level of the connectivity.

The selected roaming may be configured per service request, e.g. services that require a high required level of connectivity.

The selected roaming may be configured only if a required level of connectivity is possible to be achieved at a specific time or location. E.g. the estimated level of the connectivity is determined, and if a threshold is not met selected roaming is enabled for the wireless device.

The selected roaming is enabled by providing a re-configuration of the mobile device (e.g. via device management) to re-configure the list of enabled PLMN networks.

It may also comprise a configuration message to an administration server in the partnering network to add a specific device to the list of enabled devices for roaming (or increase the number of devices of the first operator that may make use of roaming). This has the purpose that the device is not rejected from establishing connectivity when it registers in the other target network.

These embodiments may increase the estimated level of connectivity or may aid in ensuring a required level of the connectivity in a cost-effective form by enabling on-demand roaming among operators/networks.

Determining Level of Connectivity

As mentioned, the wireless network 100 may determine the level of the connectivity based on one or more conditions relating to at least one connection for the wireless device 110, the network node 120 and/or the service. In the following the term "M2M device" will be used to refer to the wireless device 110, the first network node 120 and/or the service.

The expression "a connection for the M2M device" refers to that a connection is usable by the M2M device.

The connection that is useable by the wireless device 110 shall be understood to mean a connection which the M2M device is capable of using or which the M2M device already uses. The connection that the M2M device is capable of using may be called a potential or possible connection. Thus, the potential connection for the M2M device is not yet established, i.e. the M2M device is not attached to the wireless network 100 by means of such potential connection.

An already used connection does not necessarily mean that the connection is actively used for transmission of data. Instead, it is enough that the already used connection is established between the wireless device 110 and e.g. the first network node 120. For LTE, this means that the wireless device 110 can be in either so called idle mode or connected mode, which modes are referred to as RRC_IDLE and RRC_CONNECTED in Technical Specification (TS) 36.331 of the 3GPP group.

In the following examples, criteria for when to consider the level of connectivity to be high are given.

As a first example, the conditions relating to the at least one connection for the M2M device include, as mentioned, the number of connections for the M2M device.

At least U number of possible connections, which sometimes may be called connectivity links or paths, may be provided to the M2M device at a sufficiently good link quality.

Possible connections may be:
  connections of the same radio technology, e.g. same or different frequency carriers, but e.g. to different base stations,
  connections of the same radio technology to the same base stations but at different frequencies,
  connections provided via different radio technologies, e.g. to the same or different base stations,
  connections that provide connectivity to different access networks/operators,
  fixed/wired connections, such as copper wires and the like.

Base station may here refer to radio network nodes, access points, relay nodes, repeaters and the like.

For the case above, the different connections can either be established simultaneously to the device or in case only some of the connections are established it is predicted, based e.g. on measurements, that it would be possible to establish the alternative connections in case the first set of connections are deemed lost.

As a second example, the conditions relating to the at least one connection for the M2M device include, as mentioned, the quality of connections for the M2M device.

The connections of the M2M device may be provided at a desired QoS level with a significant so called link margin.

For example, when the required transmit power of the M2M device is consistently X dB below the permitted power as determined by the wireless network 100 e.g. depending on interference restrictions.

As other example, the required radio resources for a connection are consistently Y % less than what is allocated, or available, for a connection. In detail, this may be that only half, i.e. Y=50%, of the bit rate specified for the connection, i.e. a Guaranteed Bit Rate (GBR) bearer, is used.

As a third example, the conditions relating to the at least one connection for the M2M device include, as mentioned, the variance of quality of connections for the M2M device. When the variance of quality of connections is below Z for all or at least S number of connections, then the level of connectivity may be considered high, assuming the average quality of the connections is considered good as is explained in the example below.

An example of quality of connections is connection margin, or link margin. Now assume that the M2M device has a certain level of connectivity, e.g. there are two connections available with at least 10 dB margin beyond what is needed for the required quality of service. The certain level of connectivity may be considered as a fulfilling the high connectivity state requirement if the margin has been stable over a time period. E.g. the margin was at least 10 dB during 95% of the time during the last 180 days, and variance of the margin was below a threshold Z.

At the same time, another M2M device with the same certain level of connectivity may be considered as not fulfilling the high connectivity state requirement for this other M2M device. As reason for this may be that in order to consider the other M2M device to fulfill the high connectivity state requirement, it may be required that the margin is very stable, i.e. variance of the margin should be less than P, where P=0.7*Z as an example. This means that P<Z.

In these manners, the estimated level of the connectivity for the M2M device is taking time dynamics of the quality of connections into account.

As a fourth example, the conditions relating to the at least one connection for the M2M device include, as mentioned, the correlation between connections for the M2M device. When the correlation of connections is below U for all or at least T number of connections, then the level of connectivity may be considered high.

As an example, connections which have many common elements or properties are considered to have high correlation, while connections which have different elements or properties have low correlation. Examples of elements include nodes, transport links, antennas, hardware configuration and the like. Examples of properties include radio frequency band, radio access technology or the like.

As a further example, assume a first path has a set of nodes x1 and links y1 and networks z1 to pass through, and a second path has accordingly x2/y2/z2 nodes/links/networks. A failure correlation, e.g. given as a value between 0 for no correlation and 1 for full correlation is determined e.g. by the M2M device. This can e.g. be done by determining how many of the x1/y1/z1 are common with x2/y2/z2. In this correlation also characteristics of the different elements in x/y/z may be considered. E.g. if the first and second paths share a common backhaul link, this link is determined to affect the correlation largely; at the same time, if the first and second paths share a common optical fiber transport link between two cities, this transport link may be considered as not affecting the correlation strongly, if it is determined that this link has a low probability of failure or a technical fallback mechanism in-build. Essentially this means that different nodes and links are assigned different weights depending on the individual reliability of the node and link when determining the overall failure correlation.

As a fifth example, the conditions relating to the at least one connection for the M2M device include, as mentioned, the network conditions impacting connections for the M2M device. The network conditions may be network load, radio interference, radio obstructions etc. The network load may refer to traffic generated from other users in a local area of the M2M device, number of active users etc. The radio interference may relate to harmful radio transmission received from other users, which decreases signal quality received at the M2M device. The radio obstructions may be if a user is in or behind a house which leads to weaker radio signals.

In further examples, the conditions relating to the at least one connection for the M2M device may include information about the mobility, e.g. stationary, limited movement, fully mobile, and capabilities of the M2M device, e.g. supported radio access, supported frequency bands, processing capabilities, power classes, etc.

Service Requirements

In a wireless communication system like LTE, the service requirements may be defined by a set of parameters relating to Quality of Service (QoS). In 3GPP Technical Specification (TS) 23.203, a set of QoS Class Indicators (QCI) are described. The service that is set up is thus associated with a certain QCI, in e.g. a range from 1 to 9. Each QCI describes for example acceptable delay and error rate for the associated service.

Service requirements are also defined for GSM, UTRAN and the like.

Adapting Operation

Now that the M2M device has received or estimated the estimated level of connectivity, the M2M device is able to adapt its operation based on the estimated level of connectivity. As mentioned, the wireless device 110 may be referred to as the M2M device.

One way of adapting the operation for the M2M device is to select a mode of operation for the service, referred to as service mode, based on the estimated level of the connectivity.

The M2M device selects one of the service modes based on the level of the connectivity. As an example, the M2M device may select a service mode that is proportional to the level of the connectivity when the service mode is represented by a number, or digit. Higher numbers may correspond to that higher levels of the connectivity are required for the service to be executed with high reliability, e.g. in a secure manner or fail safe manner. A high level of the connectivity typically means that there is a high probability, e.g. above a threshold value such as 0.9, that the connectivity will be maintained.

In some embodiments, the service modes may comprise at least two modes of operation. Thus, the service modes may comprise a first service mode and a second service mode.

In these embodiments, the M2M device may select the first service mode when the estimated level of the connectivity exceeds a first value of connectivity for allowing the service to be operated in the first service mode. The first value may be specified in a standard, pre-configured by end user/operator, and signaled dynamically e.g. when the M2M device registers to the wireless network 100. Alternatively, the M2M device may select the second service mode when the estimated level of the connectivity exceeds a second value of connectivity for allowing the service to be operated in the second service mode.

As an example, a control system may comprise the M2M device and a controller node for controlling the M2M device. In this example, the service of the M2M device may be said to be allowed to be operated in the first or second service mode when the control system is stable. Stable, or stability, has its conventional meaning when used in connection automatic control engineering, i.e. the control system may not easily be set into a state where control signals oscillate or are outdated such that the control system ceases to work as intended.

Another way of adapting the operation for the M2M device is to adjust an amount of probe messages based on the required level of the connectivity and the estimated level of the connectivity. Thanks to sending of probe messages the M2M device may determine if it has connectivity, e.g. by receiving a response to the sent probe message. In case, the M2M device is a so called device server, it may send probe messages to determine if it has lost connectivity to a client device because the device server does no longer receive the probe messages sent by the client device, i.e. the probe messages are sent from the client device as keep alive signaling. In this context, a device server is serving the client device with respect to a service executed by the client device.

The probe messages are sent, by the M2M device, to the wireless network 100 for verification of the required level of the connectivity.

The amount of the probe messages may relate to one or more of:

a periodicity at which the probe messages are sent from the M2M device;

number of cells to which the probe messages are sent;

number of radio access technologies used when the probe messages are sent;

number of carriers used when the probe messages are sent, and the like.

The periodicity at which the probe messages are sent from the M2M device may be an indication of in which time slots, the M2M device may send the probe messages. The periodicity may sometime be given by a frequency value.

The number of cells, typically per each radio access technology used, to which the probe messages are sent may relate to a number of radio network nodes, such as the radio network node 130, to which the probe messages are sent or broadcast.

The number of radio access technologies used when the probe message are sent may be that one radio network node, such as the radio network node 130, is a multi-RAT radio network node. Then, it may be that the probe messages are sent on connections using some or all of these multi-RATs in order to adjust the amount of probe messages sent.

The number of carriers, or carrier frequencies, used when the probe messages are sent may be that one radio network node, such as the radio network node 130, is capable of transmitting and receiving at a plurality of frequencies. Then, it may be that the probe messages are sent on connections using some or all of the plurality of frequencies in order to adjust the amount of probe messages sent.

As already mentioned above, the amount of probe message may relate to a combination of one or more of the above mentioned meanings of the amount of probe messages. Hence, the adjusting of the amount of the probe messages may be an adaption of number of the probe messages sent over various connections, or links, according to the above.

Figure 5:
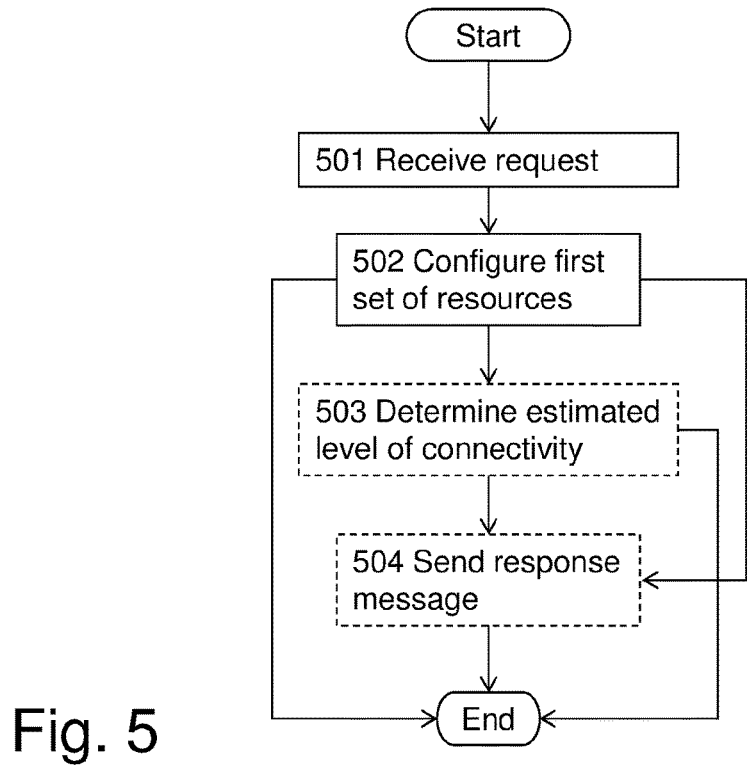
FIG. 5 is a flow chart illustrating a procedure in a first network node, according to further possible embodiments.

An example of a procedure with actions, performed by a first network node of a wireless network, for managing a request for a connectivity for a service of a wireless device, will now be described with reference to the flow chart in FIG. 5 and also to the signalling diagram in FIG. 4, the first network node being denoted 120. It is assumed that the first network node 120 is comprised in a wireless network 100, and that the first network node 120 is configured to use a first set of resources of the wireless network 100. The first network node is thus arranged or configured to perform the actions of the flow chart in FIG. 4.

A first action 501 illustrates that the first network node 120 receives the request for the connectivity, wherein the request is associated with a required level of a connectivity for the service, wherein the required level of the connectivity relates to likelihood of maintaining the connectivity towards the wireless network 100. The request may be received from the wireless device 110 or from the second network node 150 for managing requests for connectivity. This action is similar to action 403.

In another action 502, the first network node 120 configures, referred to as "the configuring" directly below, the first set of resources to increase an estimated level of the connectivity for the service towards the wireless network 100, wherein the estimated level of the connectivity is associated with the wireless network 100. This action is similar to action 404.

The configuring includes one or more of:
reserving a sub-set of the first set of resources for the service, wherein at least the sub-set of resources are required to ensure the required level of the connectivity;
reducing an amount of the first set of resources, which amount of the first set of resources are assigned to a further service in advance of or when the service becomes active;
moving a further service, to which some of the first set of resources have been assigned, in advance of or when the service becomes active, to a second set of resources, wherein the second set of resources is different from the first set of resources;
increasing the first set of resources by allocating random access channel to the service and/or transmit with increased transmit power;
setting up a connection towards the wireless device 110 while using at least some of the first set of resources; and
sending a message to the wireless device 110, wherein the message instructs the wireless device 110 to measure on non-serving cells, non-serving frequencies, non-serving Radio Access Technologies to find a third set of resources for increasing the estimated level of the connectivity, wherein the third set of resources is different from the first set of resources.

In a further action 503, the first network node 120 may determine the estimated level of connectivity. This action is similar to action 406.

In a still further action 504, the first network node 120 may send, to the wireless device 110, a response message indicating a relation between the estimated level of connectivity and the required level of connectivity. This action is similar to action 407.

Figure 6:
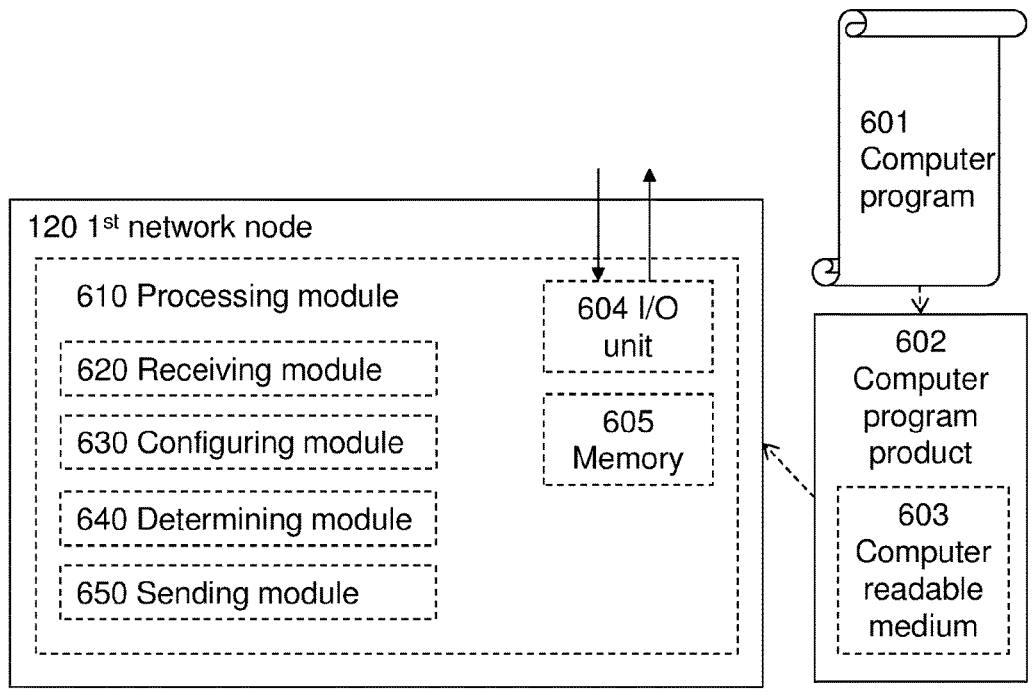
FIG. 6 is a block diagram illustrating a first network node in more detail, according to further possible embodiments.

A detailed but non-limiting example of how a first network node of a wireless network may be structured with some possible functional entities such as modules, circuits or units, to bring about the above-described functionality of the first network node, is illustrated by the block diagram in FIG. 6. In this figure, the first network node 120 is configured to manage a request for a connectivity for a service of a wireless device, not shown, wherein the first network node 120 is comprised in a wireless network, and wherein the first network node 120 is configured to use a first set of resources of the wireless network. The first network node 120 may be configured to operate according to any of the examples and embodiments of employing the solution as described above and as follows. In particular, the first network node 120 may be arranged or configured to perform at least the actions of the flow chart in FIG. 5 in the manner described above.

The first network node 120 may comprise a suitable processing module 610 in which an input/output unit 604 and a memory 605 are arranged. Moreover, the first network node 120 may comprise a determining module 640 and/or a sending module 650.

The processing module 610 may be configured as described for the first network node 120 above. The processing module 610 may comprise a receiving module 620 which is configured to receive the request for the connectivity, wherein the request is associated with a required level of a connectivity for the service, and wherein the required level of the connectivity relates to likelihood of maintaining the connectivity towards the wireless network. As mentioned, the may be received from the wireless device 110 or from a second network node 150 for managing requests for connectivity.

The processing module 610 may also comprise a configuring module 630 which is configured to configure the first set of resources to increase an estimated level of the connectivity for the service towards the wireless network, wherein the estimated level of the connectivity is associated with the wireless network.

The first network node 120, or the configuring module 630, may be configured to configure the first set of resources by being configured to one or more of:
reserve a sub-set of the first set of resources for the service, wherein at least the sub-set of resources are required to ensure the required level of the connectivity;
reduce an amount of the first set of resources, which amount of the first set of resources are assigned to a further service in advance of or when the service becomes active;
move a further service, to which some of the first set of resources have been assigned, in advance of or when the service becomes active, to a second set of resources, wherein the second set of resources is different from the first set of resources;
increase the first set of resources by allocating random access channel to the service and/or transmit with increased transmit power;
set up a connection towards the wireless device 110 while using at least some of the first set of resources; and
send a message to the wireless device 110, wherein the message instructs the wireless device 110 to measure on non-serving cells, non-serving frequencies, non-serving Radio Access Technologies to find a third set of resources for increasing the estimated level of the connectivity, wherein the third set of resources is different from the first set of resources.

The first network node 120 may be configured to determine, e.g. by means of the processing module 610 or the determining module 640, the estimated level of connectivity; and to send, e.g. by means of the processing module 610 or the sending module 650, to the wireless device 110, a response message indicating a relation between the estimated level of connectivity and the required level of connectivity.

The above first network node 120 and its functional modules may be configured or arranged to operate according to various optional embodiments, e.g. one or more of the embodiments described above in connection with FIGS. 4 and 5.

The embodiments and features described herein may be implemented in a computer program 601 for managing a request for a connectivity for a service of a wireless device 110. The computer program 601 comprises computer readable code units which, when run on the first network node 120, causes the first network node 120 to perform the above actions e.g. as described for FIG. 5 and the functionality described for the first network node 120 in FIG. 6. Further, the above-described embodiments may be implemented in a computer program product 602 comprising a computer readable medium 603 on which the above computer program 601 is stored. The computer program product 602 may be a compact disc or other carrier suitable for holding the computer program 601. Some examples of how the computer program 601 and computer program product 602 may be realized in practice are outlined below.

The functional modules 610-630 described above for FIG. 6 may be implemented in the first network node 120 by means of program modules of the computer program 601 comprising code means which, when run by a processor causes the first network node 120 to perform the above-described actions and procedures. The program modules may be stored in the memory 605.

As used herein, the term "resource" may refer to a certain coding of a signal and/or a time frame and/or a frequency range in which the signal is transmitted. In some examples, a resource may refer to one or more physical resource blocks (PRB) which are used when transmitting the signal. In more detail, a PRB may be in the form of orthogonal frequency division multiplexing (OFDM) PHY resource blocks (PRB). The term "physical resource block" is known from 3GPP terminology relating to e.g. Long Term Evolution Systems.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, a Random-Access Memory (RAM), a Read-Only Memory (ROM) or an Electrically Erasable Programmable ROM (EEPROM) or the like. Furthermore, the term "memory" may refer to an internal register memory of a processor, a so called cache or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first network node, for managing a request for a connectivity for a service of a wireless device, wherein the first network node is comprised in a wireless network, wherein the first network node is configured to use a first set of resources of the wireless network, and wherein the method comprises:
   receiving the request for the connectivity, wherein the request is associated with a required level of a connectivity for the service, wherein the required level of the connectivity relates to likelihood of maintaining the connectivity towards the wireless network; and
   configuring the first set of resources to increase an estimated level of the connectivity for the service towards the wireless network, wherein the estimated level of the connectivity is associated with the wireless network, wherein the level of the connectivity can be configured as a probability, for the service, to maintain the connectivity towards the wireless network, wherein the probability is linked to at least one of a time period and an event, and
   wherein configuring the first set of resources comprises one or more of:
      reserving a sub-set of the first set of resources for the service, wherein at least the sub-set of resources is required to ensure the required level of the connectivity;
      reducing an amount of the first set of resources, which amount of the first set of resources is assigned to a further service in advance of or when the service becomes active;
      moving a further service, to which some of the first set of resources have been assigned, in advance of or when the service becomes active, to a second set of resources, wherein the second set of resources is different from the first set of resources; and
      increasing the first set of resources by at least one of allocating a random access channel to the service and transmitting with increased transmit power.

2. The method according to claim 1, wherein the request is received from the wireless device or from a second network node for managing requests for connectivity.

3. The method according to claim 1, wherein the method further comprises:
   determining the estimated level of connectivity;
   sending, to the wireless device, a response message indicating a relation between the estimated level of connectivity and the required level of connectivity.

4. A first network node configured to manage a request for a connectivity for a service of a wireless device, wherein the first network node is comprised in a wireless network, wherein the first network node is configured to use a first set of resources of the wireless network, wherein the first network node comprises:
   receiving circuitry configured to receive the request for the connectivity, wherein the request is associated with a required level of a connectivity for the service, wherein the required level of the connectivity relates to a likelihood of maintaining the connectivity towards the wireless network; and
   processing circuitry configured to configure the first set of resources to increase an estimated level of the connectivity for the service towards the wireless network, wherein the estimated level of the connectivity is associated with the wireless network, wherein the level of the connectivity can be configured as a probability for the service to maintain the connectivity towards the wireless network, wherein the probability is linked to at least one of a time period and an event, and
   wherein the processing circuitry is configured to configure the first set of resources by being configured to perform one or more of:
      reserving a sub-set of the first set of resources for the service, wherein at least the sub-set of resources is required to ensure the required level of the connectivity;
      reducing an amount of the first set of resources, which amount of the first set of resources is assigned to a further service in advance of or when the service becomes active;
      moving a further service, to which some of the first set of resources have been assigned, in advance of or when the service becomes active, to a second set of resources, wherein the second set of resources is different from the first set of resources; and
      increasing the first set of resources by at least one of allocating a random access channel to the service and transmitting with increased transmit power.

5. The first network node according to claim 4, wherein the request is received from the wireless device or from a second network node for managing requests for connectivity.

6. The first network node according to claim 4, wherein the processing circuitry is configured to:
   determine the estimated level of connectivity; and
   send, to the wireless device via transmitting circuitry of the first network node, a response message indicating a relation between the estimated level of connectivity and the required level of connectivity.

7. A non-transitory computer readable storage medium storing a computer program for managing a request for a connectivity for a service of a wireless device comprising computer readable code units that, when executed by at least one processor of a first network node configured to use a first set of resources of a wireless network, cause the first network node to:
   receive the request for a connectivity, wherein the request is associated with a required level of connectivity for the service, wherein the required level of the connectivity relates to a likelihood of maintaining the connectivity towards the wireless network; and
   configure the first set of resources to increase an estimated level of the connectivity for the service towards the wireless network, wherein the estimated level of the connectivity is associated with the wireless network, wherein the level of the connectivity can be configured as a probability for the service to maintain the connectivity towards the wireless network, wherein the probability is linked to at least one of a time period, and an event, and
   wherein the computer readable code units that cause the first network node to configure the first set of resources are further configured to:
      reserve a sub-set of the first set of resources for the service, wherein at least the sub-set of resources is required to ensure the required level of the connectivity;
      reduce an amount of the first set of resources, which amount of the first set of resources is assigned to a further service in advance of or when the service becomes active;
      move a further service, to which some of the first set of resources have been assigned, in advance of or when the service becomes active, to a second set of resources, wherein the second set of resources is different from the first set of resources; and
      increase the first set of resources by at least one of allocating a random access channel to the service and transmitting with increased transmit power.

\* \* \* \* \*